United States Patent [19]

Snyder

[11] 3,981,491

[45] Sept. 21, 1976

[54] WORK STAND FOR BICYCLES

[76] Inventor: Donald H. Snyder, 128 S. Monroe St., Blissfield, Mich. 49228

[22] Filed: Nov. 28, 1975

[21] Appl. No.: 636,230

[52] U.S. Cl. .................................... 269/64; 211/22; 269/243

[51] Int. Cl.² ......................... B25B 1/14; B23Q 3/18

[58] Field of Search ......................... 269/64, 71, 243; 211/22

[56] References Cited

UNITED STATES PATENTS 3,514,091 5/1970 Johnson et al. ........................ 211/22

FOREIGN PATENTS OR APPLICATIONS 809,297 12/1936 France .................................. 269/64

5,188 3/1910 United Kingdom ................... 269/64

*Primary Examiner*—Al Lawrence Smith
*Assistant Examiner*—Robert C. Watson
*Attorney, Agent, or Firm*—Malcolm W. Fraser

[57] ABSTRACT

On an upright support is an apparatus including a pair of relatively movable jaws between which a tubular frame member of a bicycle is securely clamped. One jaw has a rigid short sleeve terminating in a circular row of teeth adapted to mesh and lock with a similar circular row of teeth on the end of a rigid tube support in dentil fashion. Extending through the tube support is a shaft fixed to the short sleeve, which has a bushing bearing in the tube support. By a manually adjustable nut and screw device, the rows of teeth can be separated to enable the jaws to revolve thereby to position the bicycle in the most convenient work position. A manually adjustable nut and screw device enable the clamping jaws to be tightened or released.

1 Claim, 4 Drawing Figures

WORK STAND FOR BICYCLES

SUMMARY OF THE INVENTION

Without a support, it is difficult to work on a bicycle. Not only is it awkward, but back-breaking to lean over a bicycle to make repairs on it. In accordance with this invention, a bicycle is clamped rigidly by jaws actuated to grip a frame part of a bicycle, the apparatus being spaced above the floor in a position convenient to the workman. The bicycle clamping is such that, by a manual release, the bicycle and clamps may be revolved, and when the desired position is reached, the apparatus is locked securely in place. An object is to produce such a bicycle work stand which is relatively simple and inexpensive, and which has the unique features of construction and operation hereinafter described.

DESCRIPTION OF THE PREFERRED EMBODIMENT

Figure 2:
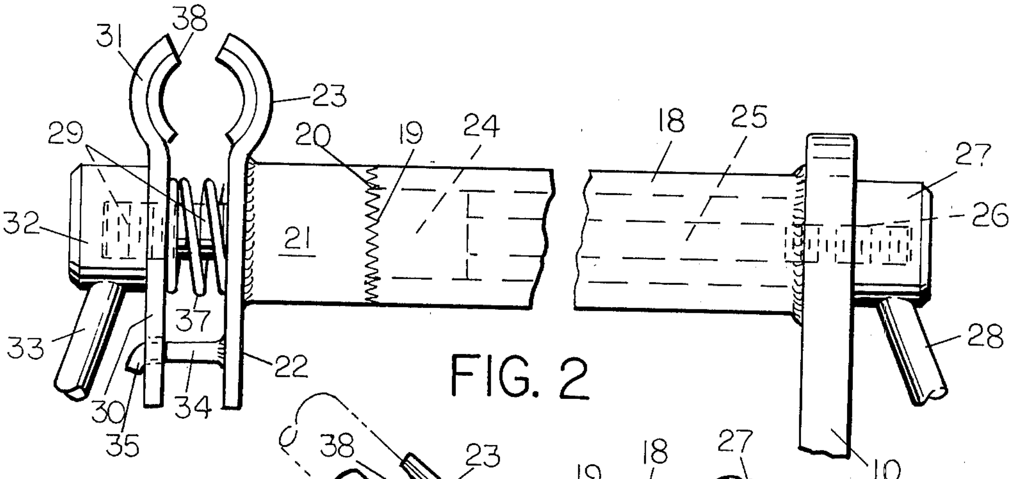
FIG. 2 is a side elevation of the work stand with portions of the support and adjusting handles broken away.
Figure 1:
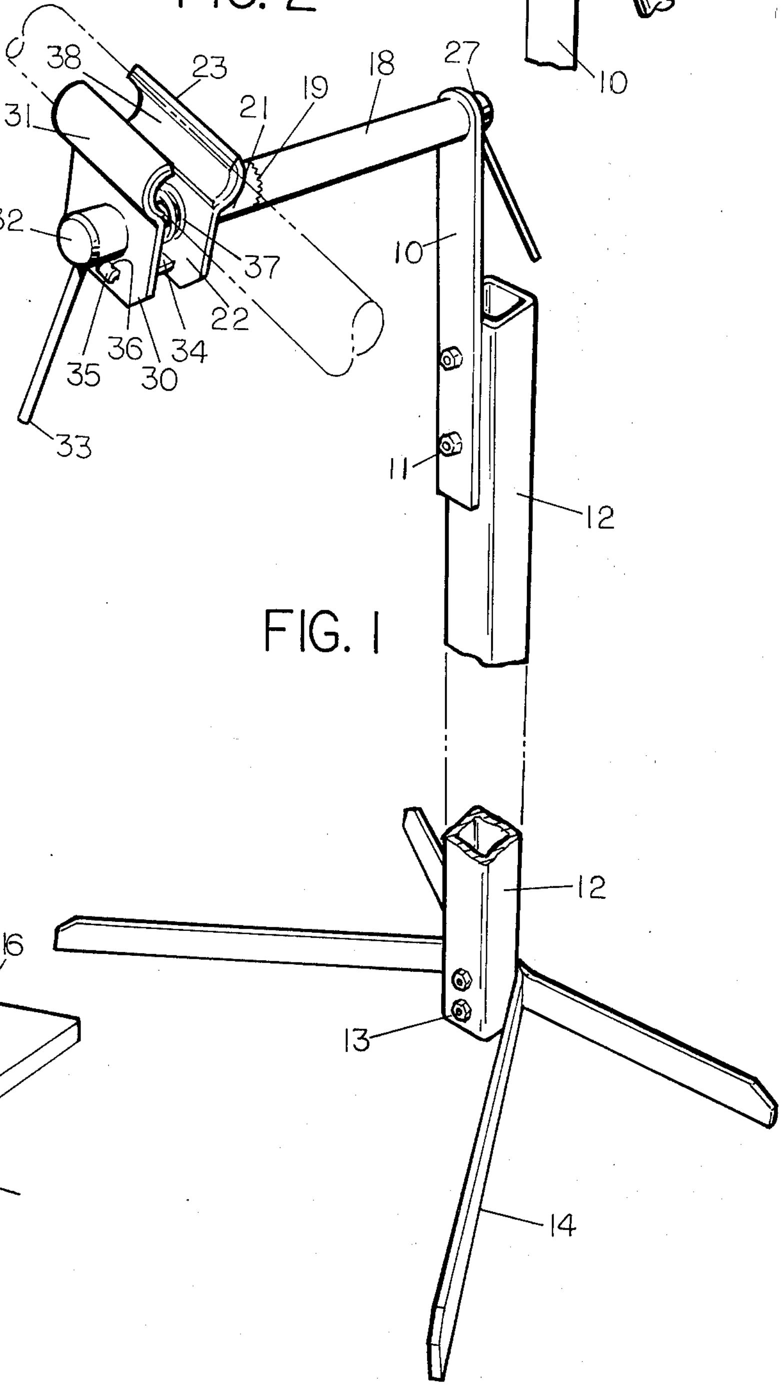
FIG. 1 is a top perspective view of the work stand for bicycles showing, by broken lines, a bicycle frame member clamped between the jaws in position of use.
Figure 3:
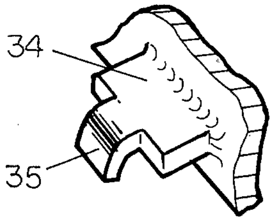
FIG. 3 is a fragmentary view showing the jaw support finger which is carried by the stationary jaw and connects to the movable jaw for holding the two jaws in the proper relative position.

The illustrated embodiment of the invention comprises a work stand for bicycles having a vertical support bar 10 which is secured by bolt and nut assemblies 11 to an upright stand in the form of a beam 12. At the lower end of the beam 12, and connected by bolt and nut assemblies 13, are suitable feet 14 for supporting the assembly in upright position.

Figure 4:
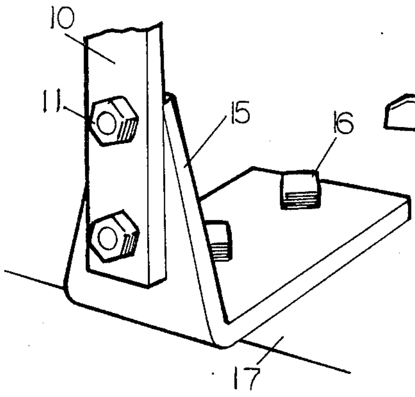
FIG. 4 is a fragmentary perspective view showing an alternate support for the apparatus to be bolted to the top of a work table.

FIG. 4 shows an alternate form of mounting of the work support. In this instance, the support bar 10 is secured by the bolt and nut assemblies 11 to an angle bracket 15 which may be secured by bolts 16 to the top of a work table 17.

Welded to the upper end of the support bar 10 is one end of a horizontal tube 18 which, at its opposite end, has a circular row of teeth 19. Adapted to mesh in locking engagement with the teeth 19 is a similar circular row of teeth 20, the two rows of teeth engaging in dentil fashion to lock a short sleeve 21 which carries the row of teeth 20. At the other end of the sleeve 21 is welded a clamping plate 22 which is provided at its upper end with a clamping jaw 23.

Rigid with the short sleeve 21, and projecting outwardly therefrom in bearing relation within the sleeve 18, is a bushing 24. Fixed to the bushing 24, and extending freely through the horizontal tube 18, is a shaft 25. The shaft 25 has a screw threaded end portion 26 which extends freely to the outside through a hole in the support bar 10. Screwed to the end of the extension 26 is a cap nut 27 which has an operating handle 28. It will be understood that the cap nut 27 bears against the outer face of the bar 10, and by turning the cap nut 27 in one direction or the other, the teeth 21 and associated parts are brought toward or away from the annular row of teeth 19, thereby enabling the clamping jaws to be freed for revolving movement or tightened in a selected position of adjustment.

Rigid with the bushing 24, and projecting in the opposite direction from the shaft 25, is a screw threaded shaft extension 29 which extends freely through a movable jaw plate 30. On the plate 30 is a clamping jaw 31 which is disposed opposite to the clamping jaw 23 for clamping a bicycle frame member therebetween. Engaging the outer end portion of the extension 29 outside of the plate 30 is a cap nut 32 which bears against the outer face of the jaw plate 30 for moving the jaw plate 30 in clamping fashion toward the plate 22. Between the plates 22 and 30 is a coil compression spring 37 which urges the clamping plates apart. An operating handle 35 is rigid with the cap nut 32 for operating same.

A jaw support plate 34 is welded at one end to the inner face of the jaw plate 22. Formed on this plate, and inclined downwardly, is a relatively narrow finger 35 which extends through a hole 36 in the plate 30. In this manner, the two clamping plates are maintained in spaced position, but when the cap nut 32 is tightened against the plate 30, the latter can then rock the plate 30 toward the plate 22 for effecting clamping operation. To effect the desired gripping against the bicycle frame bar, the clamping faces of the jaws 23 and 31 are provided with rubber linings 38.

It is to be understood that the above is a full description of the preferred form of my work stand for bicycles, but numerous changes in details of construction, arrangement, and operation may be effected within the scope of my invention.

What I claim is:

1. A bicycle work stand comprising a. a support bar, b. means for holding said support bar in an upright position, c. a horizontal sleeve fixed at its outer end to said support bar, d. a circular row of teeth on the inner end of said sleeve, e. a relatively short tube at the inner end of said horizontal sleeve and axially aligned therewith, f. a circular row of teeth on an end of said short tube to mesh in locking engagement with said first circular row of teeth, g. a clamping plate fixed on the other end of said short tube and generally parallel to said support bar, h. a clamping jaw on the upper end of said clamping plate, i. a bushing rigid with said short tube and projecting within said horizontal sleeve in bearing relation, j. a shaft fixed to said bushing and extending freely through said horizontal sleeve, k. a screw threaded end portion on said shaft extending freely through said support bar to the outer side thereof, l. a nut on said screw threaded portion adapted when tightened to bear against said support bar to cause said rows of teeth to lockingly engage, or when loosened to free said rows of teeth so that the clamping jaw can be revolved to a selected position, m. a second screw threaded shaft rigid with said bushing and extending in a direction opposite to said first shaft, n. a movable jaw plate similar to and at one side of said first jaw plate and through which said second screw shaft extends, o. a clamping jaw on the upper end of said movable jaw plate to cooperate with said first clamping jaw, p. a nut on said second screw shaft adapted to bear against the outer face of said movable jaw plate for forcing said movable jaw plate toward and in clamping relation to said first jaw plate, q. a coil spring on said second screw shaft disposed between, and tending to urge said clamping plates apart, and r. a jaw support plate on the lower end of one jaw plate having a hook-like projection to engage in an aperture in the other jaw plate to cause rocking of the plates for effecting clamping operation.

* * * * *